(12) United States Patent
Dubbs et al.

(10) Patent No.: US 11,079,283 B2
(45) Date of Patent: *Aug. 3, 2021

(54) TEMPERATURE MEASUREMENT SYSTEM FOR FURNACES

(71) Applicants: LumaSense Technologies Holdings, Inc., Santa Clara, CA (US); Praxair Technology, Inc., Danbury, CT (US)

(72) Inventors: Tim Patrick Dubbs, Santa Cruz, CA (US); John Leonard Shaver, San Francisco, CA (US); Kreg James Kelley, Hancock, MI (US); Troy M Raybold, Danbury, CT (US); Tushar Vispute, Danbury, CT (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/364,559

(22) Filed: Mar. 26, 2019

(65) Prior Publication Data
US 2019/0219450 A1  Jul. 18, 2019

Related U.S. Application Data

(63) Continuation of application No. 15/088,833, filed on Apr. 1, 2016, now Pat. No. 10,274,375.

(51) Int. Cl.
*G01K 1/00* (2006.01)
*G01K 15/00* (2006.01)
(Continued)

(52) U.S. Cl.
CPC ............ *G01J 5/505* (2013.01); *G01J 5/0044* (2013.01); *G01J 5/089* (2013.01); *G06K 9/2081* (2013.01);
(Continued)

(58) Field of Classification Search
USPC .................................. 374/120, 1, 141, 149
See application file for complete search history.

(56) References Cited

U.S. PATENT DOCUMENTS

| 4,432,657 A | 2/1984 | Rudzki et al. |
| 4,440,496 A | 4/1984 | Milana |
| (Continued) | | |

FOREIGN PATENT DOCUMENTS

| JP | H07218442 A | 8/1995 |
| WO | 2004069547 A2 | 8/2004 |
| WO | 2013084611 A1 | 6/2013 |

OTHER PUBLICATIONS

Peter Saunders; Radiation Thermometry: Fundamentals and Applications in the Petrochemical Industry; SPIE Publications, Aug. 3, 2007 (Chapters 2, 3, 4, 6 and 7; 126 pages).

(Continued)

*Primary Examiner* — Mirellys Jagan
(74) *Attorney, Agent, or Firm* — Iurie A. Schwartz

(57) ABSTRACT

A method for measuring furnace temperatures. The method includes obtaining radiance measurements from a plurality of regions of interest (ROIs) using a plurality of thermal imaging cameras, and measuring a surface temperature using a radiance measurement obtained from an ROI selected from the plurality of ROIs. Measuring the surface temperature includes determining an effective background radiance affecting the selected ROI using radiance measurements obtained from ROIs different from the selected ROI, obtaining a compensated radiance by removing the effective background radiance from the radiance measurement obtained from the selected ROI, and converting the compensated radiance to the measured surface temperature.

22 Claims, 7 Drawing Sheets

(51) Int. Cl.
*G01K 13/00* (2021.01)
*G01J 5/50* (2006.01)
*G01J 5/00* (2006.01)
*G06K 9/46* (2006.01)
*G01J 5/08* (2006.01)
*G06K 9/20* (2006.01)
*G06K 9/32* (2006.01)
*H04N 5/247* (2006.01)
*H04N 5/33* (2006.01)

(52) U.S. Cl.
CPC ......... *G06K 9/3233* (2013.01); *G06K 9/4661* (2013.01); *H04N 5/247* (2013.01); *H04N 5/33* (2013.01); *G01J 2005/0048* (2013.01); *G01J 2005/0051* (2013.01); *G01J 2005/0055* (2013.01); *G01J 2005/0077* (2013.01)

(56) References Cited

U.S. PATENT DOCUMENTS

| | | | |
|---|---|---|---|
| 7,046,356 | B2 | 5/2006 | Bondurant et al. |
| 9,127,891 | B2 | 9/2015 | Au et al. |
| 9,196,032 | B1 | 11/2015 | Kraus et al. |
| 9,212,851 | B2 | 12/2015 | Martin et al. |
| 9,696,210 | B2 | 7/2017 | Venkatesha et al. |
| 9,702,555 | B2 | 7/2017 | Bietto et al. |
| 9,799,110 | B2 | 10/2017 | Tsuda et al. |
| 10,274,375 | B2 | 4/2019 | Dubbs et al. |
| 2005/0237519 | A1 | 10/2005 | Bondurant et al. |
| 2006/0049352 | A1 | 3/2006 | Irani et al. |
| 2009/0071257 | A1 | 3/2009 | Neagle et al. |
| 2010/0140552 | A1 | 6/2010 | Ammouri et al. |
| 2010/0310113 | A1* | 12/2010 | Esmaili ............... F27D 21/0014 382/100 |
| 2014/0080928 | A1 | 3/2014 | Kelfkens et al. |
| 2014/0105243 | A1* | 4/2014 | Tait ...................... B01J 19/0013 374/102 |
| 2015/0300989 | A1 | 10/2015 | Masleid et al. |
| 2017/0148184 | A1 | 5/2017 | Kraus et al. |
| 2018/0230009 | A1 | 8/2018 | Bedu-Amissah et al. |

OTHER PUBLICATIONS

Peter Saunders et al.; Determination of reformer-tube temperature by means of a CCD camera; High Temperatures-High Pressures, vol. 31, 1999, pp. 83-90 (8 pages).

Richard D. Roberts et al.; "Maximize Tube Life by Using Internal and External Inspection Devices"; 2005 American Institute of Chemical Engineers; Process Safety Progress (vol. 24, No. 4); Dec. 2005, pp. 258-265; also published online Sep. 2, 2005 in Wiley InterScience (www.interscience.wiley.com); DOI 10.1002/prs.10091.

J.D. Holladay et al; "An overview of hydrogen production technologies"; Catalysis Today 139 (2009). pp. 244-260; Science Direct; Elsevier 2008; 0920-5861; DOI:10.1016/j.cattod.2008.08.039.

Tang Liqiong et al.; "Integrated Mechatronic System for Reformer Tube Internal Geometric Distortion Inspection"; 2016 International Conference on Advanced Mechatronic Systems (ICHAMECHS), IEEEE, Nov. 30, 2016, pp. 443-448, XP033041321.

Brightling, J.; "Managing Steam Reformer Tubes"; Nitrogen and Methanol, British Sulfur Publishing, London, GB, No. 256, Mar. 1, 2002, XP001107378, ISSN: 1462-2378.

* cited by examiner

TEMPERATURE MEASUREMENT SYSTEM FOR FURNACES

This application is a continuation application of U.S. application Ser. No. 15/088,833, filed on Apr. 1, 2016, entitled TEMPERATURE MEASUREMENT SYSTEM FOR FURNACES of which the entire contents are incorporated herein by reference in its entirety.

BACKGROUND

Availability of local temperature measurements from within a furnace, e.g., a reformer furnace, may be critical for the operation of the furnace. Such temperature measurements may be obtained using radiation thermometry. However, the accuracy of radiation thermometry measurements may be adversely affected by the conditions within the furnace.

SUMMARY

In general, in one aspect, the invention relates to a method for measuring furnace temperatures. The method includes obtaining radiance measurements from a plurality of regions of interest (ROIs) using a plurality of thermal imaging cameras, and measuring a surface temperature using a radiance measurement obtained from an ROI selected from the plurality of ROIs. Measuring the surface temperature includes determining an effective background radiance affecting the selected ROI using radiance measurements obtained from ROIs different from the selected ROI, obtaining a compensated radiance by removing the effective background radiance from the radiance measurement obtained from the selected ROI, and converting the compensated radiance to the measured surface temperature.

In general, in one aspect, the invention relates to a non-transitory computer readable medium storing instructions for measuring furnace temperatures. The instructions include functionality for obtaining radiance measurements from a plurality of regions of interest (ROIs) using a plurality of thermal imaging cameras and measuring a surface temperature using a radiance measurement obtained from an ROI selected from the plurality of ROIs. Measuring the surface temperature includes determining an effective background radiance affecting the selected ROI using radiance measurements obtained from ROIs different from the selected ROI, obtaining a compensated radiance by removing the effective background radiance from the radiance measurement obtained from the selected ROI, and converting the compensated radiance to the measured surface temperature.

In general, in one aspect, the invention relates to a system for measuring furnace temperatures. The system includes a plurality of thermal imaging cameras and a processing unit. The processing unit is configured to obtain radiance measurements from a plurality of regions of interest (ROIs) using the plurality of thermal imaging cameras, and measure a surface temperature using a radiance measurement obtained from an ROI selected from the plurality of ROIs. Measuring the surface temperature includes determining an effective background radiance affecting the selected ROI using radiance measurements obtained from ROIs different from the selected ROI, obtaining a compensated radiance by removing the effective background radiance from the radiance measurement obtained from the selected ROI, and converting the compensated radiance to the measured surface temperature.

DETAILED DESCRIPTION

Figure 1A:
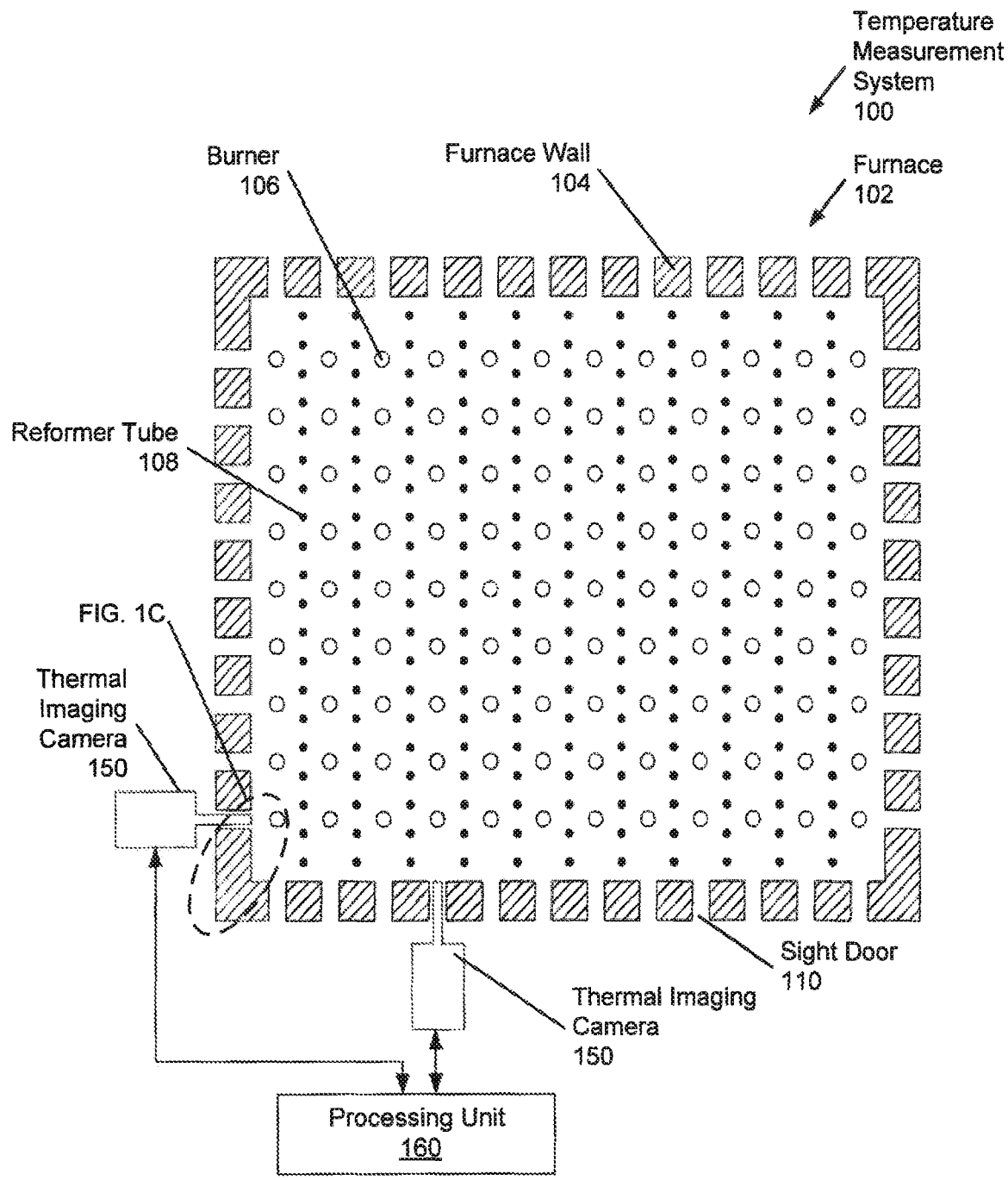
FIGS. 1A-1C show temperature measurement systems for measuring temperatures inside a furnace, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a system and methods for measuring temperatures from image data, using radiation thermometry. More specifically, accurate temperature measurements of a region of interest (ROI) may be obtained by correcting thermal radiance data, obtained from one or more thermal imaging cameras, for various factors that would otherwise negatively affect the accuracy of the temperature measurement. These factors include, but are not limited to, background radiation, e.g., radiation originating from other heat sources, that is reflected by the ROI, atmospheric attenuation, flame enhancement effects, the geometric configuration of the environment in which measurements are obtained, and the emissivity of the ROI being measured. The methods used to correct for these factors are described in detail below.

In one or more embodiments of the invention, the corrections may be performed in real-time or in near real-time, thus resulting in accurate temperature measurements even in dynamically changing environments.

The corrections may be performed for multiple ROIs within the thermal imaging camera's field of view, or for multiple ROIs within multiple cameras' fields of view, in accordance with one or more embodiments of the invention. Although the corrections for different ROIs may be performed separately for each ROI, interdependencies between ROIs, further described below, may be considered.

Figure 1B:
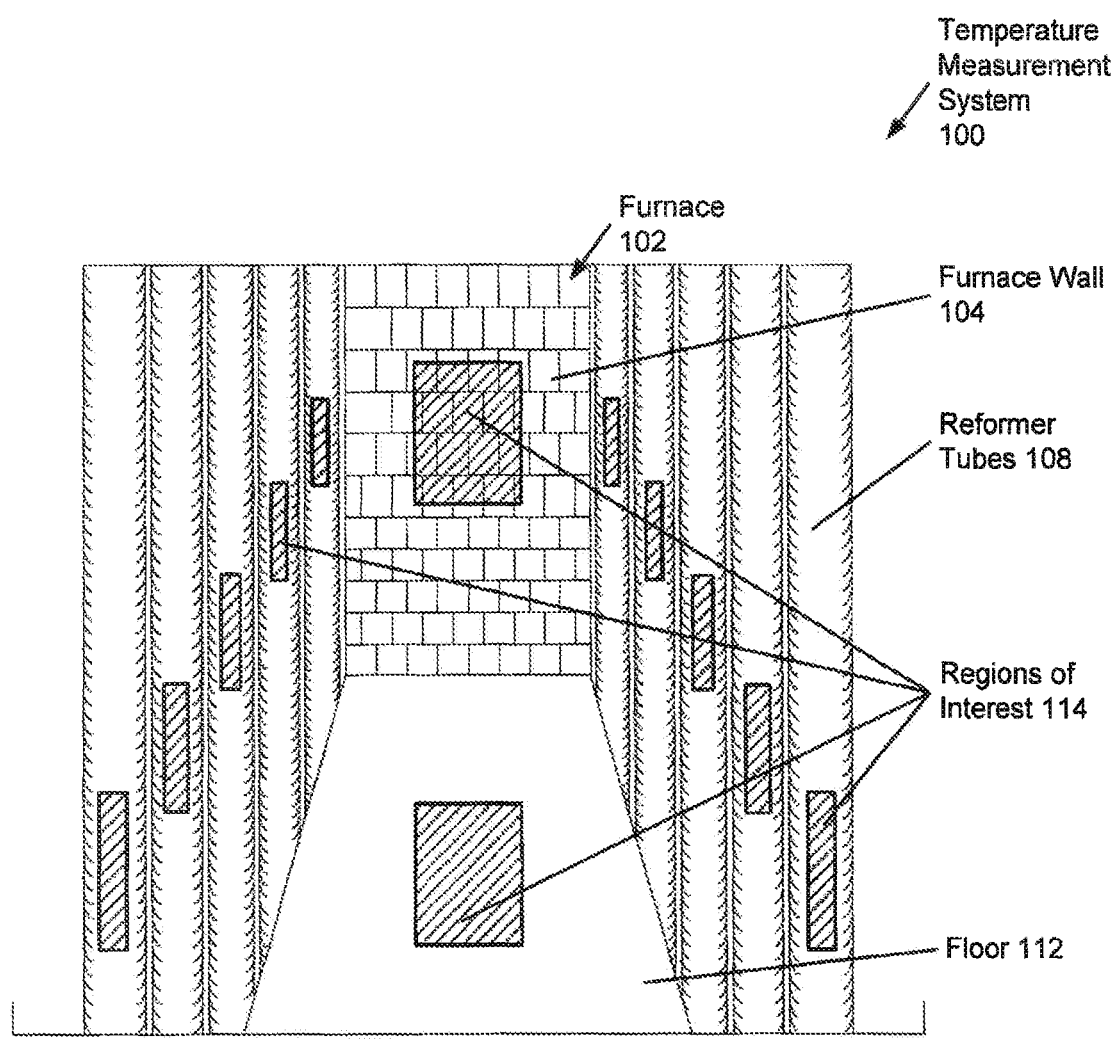
Figure 1C:
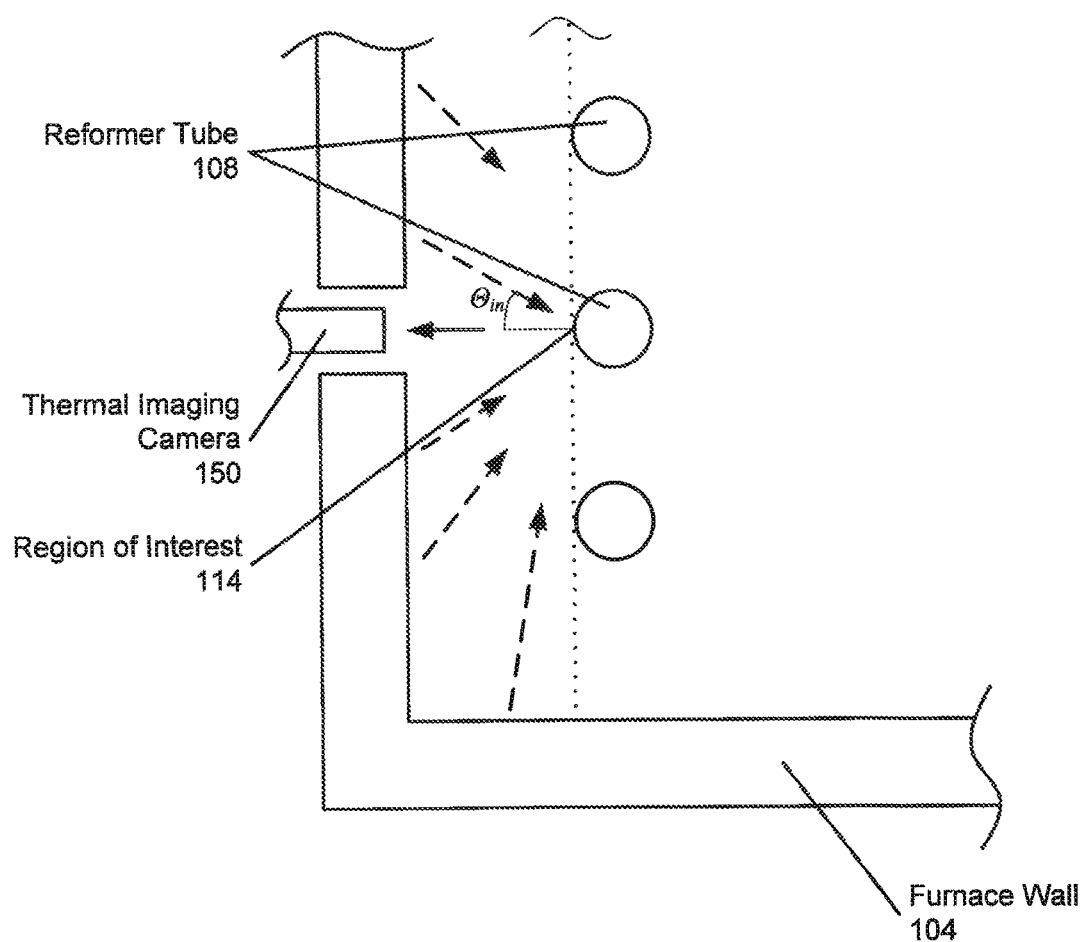

FIGS. 1A-1C show temperature measurement systems (100) in accordance with one or more embodiments of the invention. FIG. 1A shows a top view of an exemplary furnace (102) and thermal imaging cameras (150). FIG. 1B shows a side view into the furnace (102). The view shown in FIG. 1B is an example of a view that a thermal imaging camera (150) may have into the furnace (102), through a sight door (110). A thermal imaging camera, positioned to capture images from the interior of the furnace, may obtain such a view. FIG. 1C shows a top view detail of the exemplary furnace of FIG. 1A. The furnace may be, for example, a reformer furnace of a steam reformer that may be used to produce hydrogen and/or other industrial gases and fuels. The interior of the furnace (102) may be enclosed by a set of furnace walls (104). A set of reformer tubes (108) may traverse the interior of the furnace. In FIGS. 1A and 1B, the reformer tubes (108) vertically traverse the furnace from the floor (112) to the ceiling (not shown) of the furnace (102). Alternatively or additionally, reformer tubes (108) may traverse the furnace in any other orientation, e.g., horizontally. A catalytic reaction may take place within the reformer tubes (108). This catalytic reaction may be, for example, a reaction of a combination of steam and hydrocarbons into hydrogen and carbon monoxide and further to more hydrogen and carbon dioxide. The reaction, to take place, may rely on an external source of heat. In one embodiment of the invention, the external source of heat is provided by heating the reformer tubes (108) by combustion of oil or gas, e.g. natural gas, inside the furnace (102). The furnace may be top-fired, wall-fired and/or bottom-fired by burners (106).

The reformer tubes (108) may be metal tubes. These metal tubes may be exposed to high temperatures and/or high pressures. Depending on the type of reforming being performed, temperatures may be in the range of 1,000° C. and pressures may reach 100 bar. Under these conditions, the reformer tubes (108) may age. Aging may be accelerated if hot spots exist in the reformer tube walls. To prolong the life of the reformer tubes and to avoid the risk of potentially catastrophic failures, one may therefore want to regulate the furnace to avoid hot spots, for example, by making local adjustments of the fuel flow to the burners. It may therefore be necessary to measure temperatures inside the furnace (102). To detect hot spots in the reformer tube walls, it may be desirable to obtain surface temperatures of the reformer tubes. In one embodiment of the invention, regions of interest (ROIs) (114) from where temperature measurements are to be obtained therefore include multiple (many) regions on the surface of the reformer tubes. Further, temperature measurements may also be obtained from the furnace walls (104), the furnace floor (112), the furnace ceiling (not shown), etc. ROIs (114) may be located virtually on any target object in and/or on the furnace (102). Those skilled in the art will recognize that while in FIGS. 1A-1C the temperature measurement system (100) is shown as being used for measuring temperatures in a reformer furnace, the systems and the methods may be used in any other type of furnace, but also in non-furnace environments, without departing from the invention.

Continuing with the discussion of FIG. 1, the temperature measurement system (100) being used to measure surface temperatures in the furnace (102) includes thermal imaging cameras (150). The thermal imaging cameras may be positioned and oriented such that one or more regions of interest (ROIs) (114) are within the field of view of the thermal imaging cameras. Multiple cameras may be used to reach all desired ROIs (114) in the furnace (102). The thermal imaging camera(s) (150) may be located outside the furnace (102) and may get a view of the inside of the furnace through a port in one of the furnace walls (104). The exemplary furnace shown in FIG. 1A, is equipped with sight doors (110). A camera (150), installed outside of the furnace, may get a view of the inside of the furnace through one of the sight doors (110). Depending on the location of the ROIs (114), multiple sight doors (110) may be equipped with cameras (150). A sight door, in accordance with an embodiment of the invention may be equipped with a bore scope lens that may be cooled. Further, additional measures may be taken to mechanically and thermally protect the thermal imaging cameras (150). For example, a control system may automatically retract a thermal imaging camera and/or lens if the cooling of the camera is compromised.

The thermal imaging camera may be any kind of radiation thermometer that measures radiant power in a certain spectral range. The thermal imaging camera may be, for example, a CCD camera, where each pixel provides a radiation measurement, or it may be a pyrometer providing a single radiation measurement only. The incident thermal radiation may be received from regions in the field of view of the camera system, including the ROIs (108). An ROI may be represented by one or more pixels of the thermal imaging camera (150). An ROI within the field of view may be defined during the setup of the system. During the setup, an operator may select a set of pixels that correspond to a particular region in the furnace, e.g. the surface of a reformer tube and may assign them to an ROI. For example, an image, displaying the measured thermal radiance values, may be shown to the operator, and the operator may mark ROIs, e.g., by placing rectangles, circles, etc., in the displayed image. Pixels that fall into a marked region may then be considered to form an ROI. Thus, measurements of incident radiation, obtained from these individual pixels, are processed as measurements belonging to the ROI, as described in FIG. 3, and may be used as measurements of the thermal radiance of the ROI. A separate thermal radiance value may be obtained for each pixel of the thermal imaging camera. The incident radiation, captured by the thermal imaging camera, may be thermal radiation limited to a range of wavelengths, e.g., to infrared thermal radiation at a wavelength of 3.9 μm and/or 850 nm. Those skilled in the art will appreciate that any wavelength may be selected, based on criteria of the application. In particular, a wavelength may be selected to accommodate known atmospheric conditions in the furnace. For example, the wavelength may be selected to avoid wavelengths where water vapor absorption effects are known to exist, if the furnace atmosphere contains significant amounts of water vapor. Similarly, a wavelength may be picked to reduce flame enhancement effects if measurements are performed through an area of the furnace where burners are installed.

Analog or digital signals that correspond to the amount of captured incident radiation may be obtained for each pixel of the thermal imaging system. The analog or digital signals may be forwarded to a processing unit (160), where the temperature measurement, in accordance with an embodiment of the invention, is performed.

In one or more embodiments of the invention, the thermal imaging camera (150) and the processing unit (160) are calibrated to accurately measure the temperature, using the following simplifying assumptions: (i) the thermal imaging camera may respond to a single wavelength only. Accordingly, a monochromatic approximation that states that the signal, obtained by the thermal imaging camera in response to the incident radiation, is proportional to the spectral radiance of the targeted region of interest (ROI), may be used; and (ii) the measured ROI is assumed to be a blackbody. Using these assumptions, a measured temperature, $T_m$, may be calculated from the measured thermal imaging camera signal, $S_m$, using the following function:

$$T_m \approx \frac{-c_2}{\lambda \ln S_m}, \quad (1)$$

where $c_2$=0.014388 mK, is the second radiation constant, used in Planck's law. Accordingly, the unit of temperature resulting from application of Equation (1) is Kelvin. Equation (1) is a result of using Wien's approximation to Planck's law.

Further, the function $$S_m \approx \frac{-c_2}{e^{\lambda T_m}} \quad (2)$$

may be used to calculate the measured signal of the thermal imaging camera from the measured temperature.

In Equations (1) and (2), the measured temperature, $T_m$, may only match the actual temperature of a target body, if the target body is a blackbody. For any non-blackbody, the measured temperature, $T_m$, may deviate from the actual temperature of the measured target body. The measured temperature, $T_m$, in accordance with an embodiment of the invention, therefore is a radiance temperature. The radiance temperature may be understood as the temperature of a blackbody with the same spectral radiance as the actual measured body. Accordingly, the radiance temperature, $T_m$, may frequently deviate from the actual temperature of the target body because typical target bodies are not blackbodies.

Figure 2:
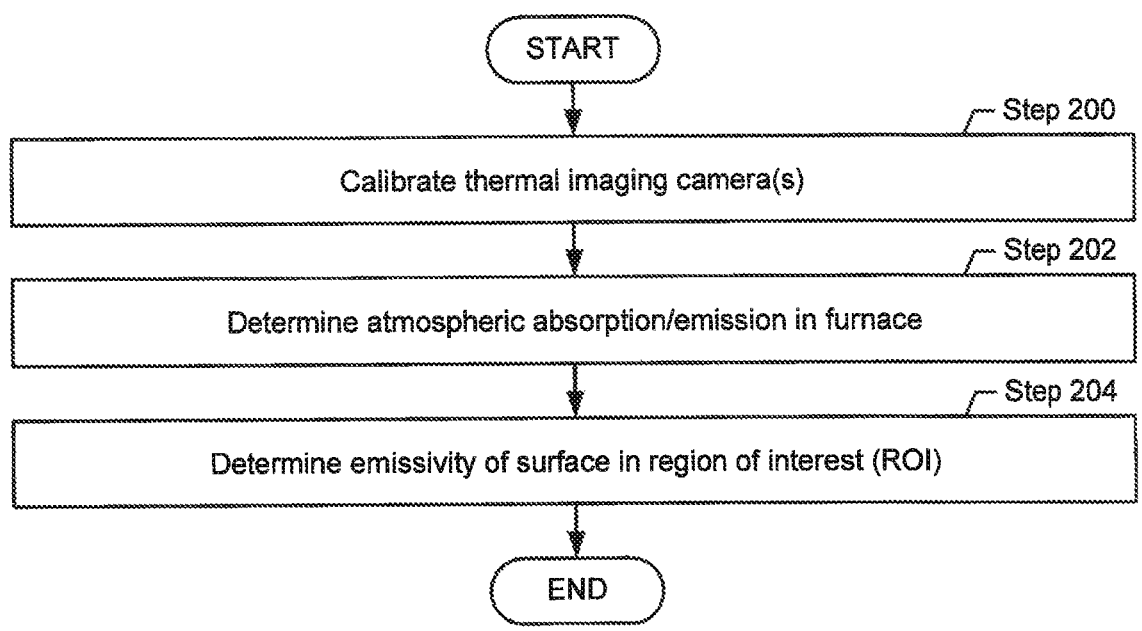
FIGS. 2-4 show a flowchart in accordance with one or more embodiments of the invention.
Figure 3:
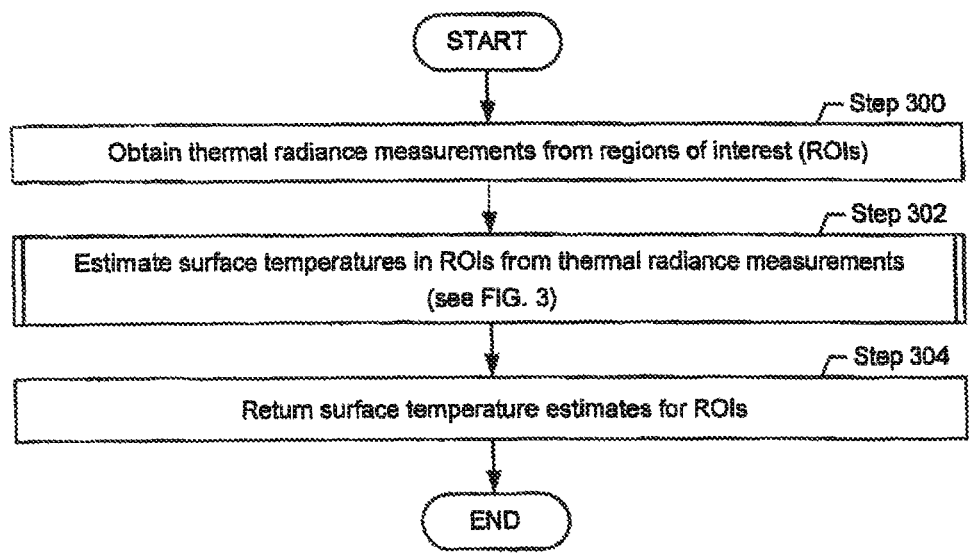
Figure 4:
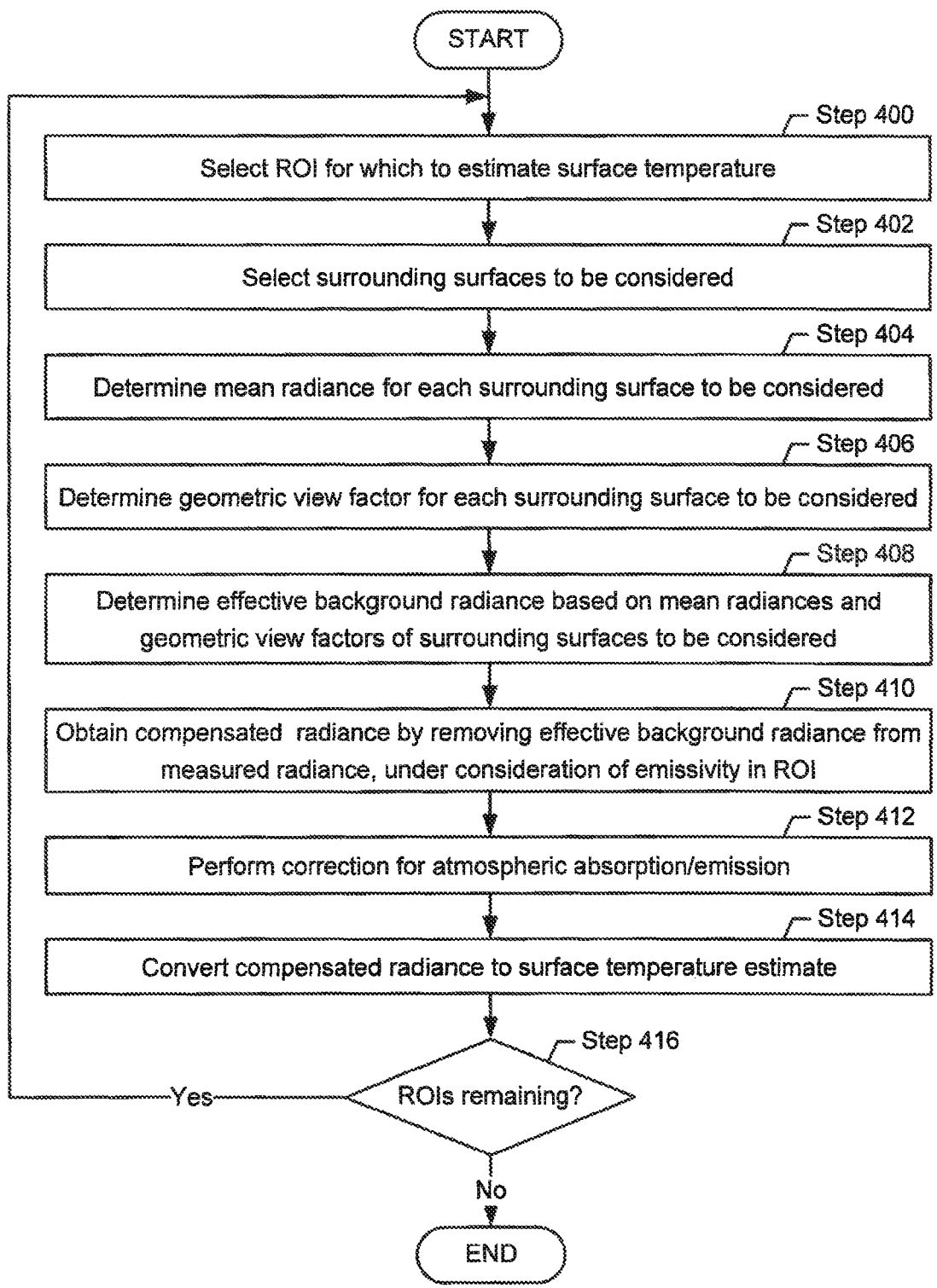

Continuing with the discussion of FIGS. 1A-1C, the processing unit (160), in accordance with an embodiment of the invention, is a computing device configured to execute at least one of the steps of the methods described in FIGS. 2-4. The processing unit may, for example, correct the signals, received by a thermal imaging camera from an ROI, for background radiation, atmospheric absorption, the geometric configuration of the environment in which measurements are obtained, and the emissivity of the ROI being measured, as subsequently described.

The furnace detail shown in FIG. 1C illustrates how background radiation may affect the measurement of a temperature in an ROI (114) on the surface of a reformer tube (108). The thermal imaging camera (150) receives radiation from the ROI (solid arrow), directed from the ROI to the thermal imaging camera. However, the reformer tube (108) is exposed to background radiation from other surfaces in the furnace, as indicated by the dashed arrows. In FIG. 1C, the source of this background radiation is the furnace wall (104). In general, any type of object, including, but not limited to, other reformer tubes, a floor, a ceiling and/or a flame may direct background radiation toward the reformer tube. In FIG. 1C, any surface in a semicircle in front of the ROI, i.e., in the angular range $-90°<\Theta_{in}<90°$, as indicated by the dotted line in FIG. 1C, may be considered as directing background radiation toward the ROI. In the general case of 3D environments, any surface in a hemisphere in front of the ROI may be considered as directing background radiation toward the ROI.

Because the reformer tube may reflect background radiation, the radiation signal received by the thermal imaging camera from the ROI may include the reflected background radiation. The radiation signal received by the thermal imaging camera therefore needs to be adjusted for the reflected background radiation, in order to obtain an accurate measurement of the temperate in the ROI, in accordance with one or more embodiments of the invention. A compensation may be performed by estimating the background radiation that the ROI is exposed to, and by removing this estimated radiation component, as described in detail below, with reference to FIG. 4. These steps may be performed by the processing unit (160).

The processing unit (160) may interface with industrial monitoring and control systems, for example, via the Open Process Control (OPC) interoperability standard for industrial automation. Output of the processing unit (160), obtained by execution of one or more of the subsequently described methods may thus be used to monitor and control the furnace (102), and/or to enhance process performance in general. The processing unit (160) may include functionality for generating alarms if temperature windows, specified for monitored ROIs, are exceeded. Further, the processing unit may include functionality for archiving temperature data obtained from the ROIs. The archived temperature data may include thermal radiance values, recorded by a thermal imaging camera, and/or temperature measurements, calculated using one or more of the methods described below. Further, the processing unit may include a visualization unit to present the thermal radiance values and/or the measured temperatures to an operator, using, for example, a textual or graphical representation such as a heat map.

Figure 5:
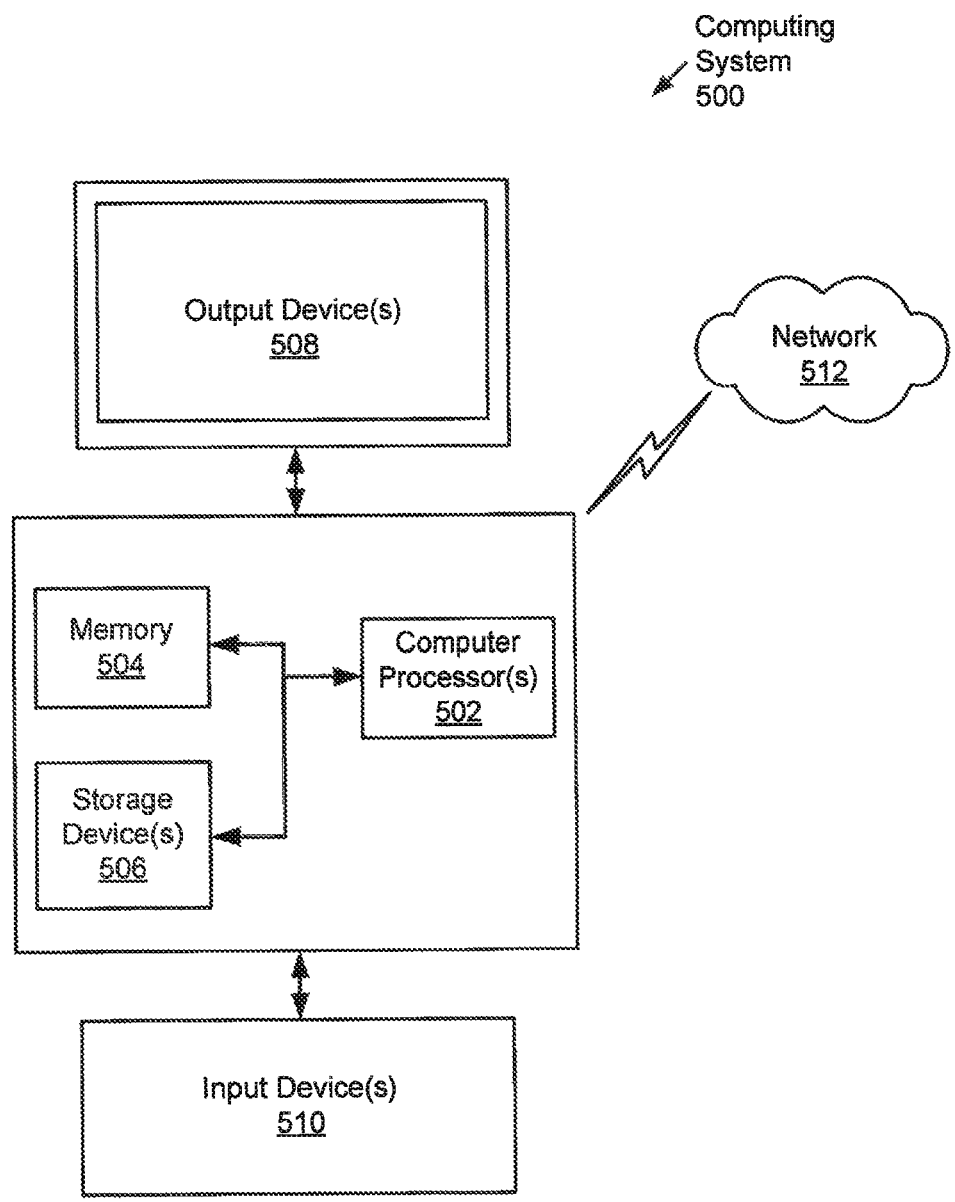
FIG. 5 shows a computer system in accordance with one or more embodiments of the invention.

In one embodiment of the invention, the processing unit (160) is a computing system similar to the one described in FIG. 5.

Those skilled in the art will appreciate that although the above-described temperature measurement system is introduced in the context of a reforming furnace, temperature measurement systems may be used in other scenarios without departing from the invention. For example, temperature measurement systems, in accordance with one or more embodiments of the invention, may be used to monitor and/or control boilers and other types of furnaces such as annealing furnaces, reheating furnaces, ovens, etc. Further, a temperature measurement system may be scaled as need or desired. For example, all regions of interest (ROIs) in a small furnace with a simple geometry may be captured by a single thermal imaging camera. Accordingly, a basic temperature measurement system may have only a single thermal imaging camera. In contrast, a large furnace with a complex geometry may require many cameras to capture all ROIs. Accordingly, a larger temperature measurement system may rely on image data from a network of many thermal imaging cameras.

FIGS. 2-4 show flowcharts in accordance with one or more embodiments of the technology. FIG. 2 shows a method for configuring the temperature measurement system for performing temperature measurements. FIGS. 3 and 4 show methods for performing the temperature measurement, in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 2-4 may be performed in parallel with any other steps shown in FIGS. 2-4 without departing from the technology.

FIG. 2 shows a method for configuring the temperature measurement system for performing temperature measurements. The steps described in FIG. 2 may be executed once during the setup of the temperature measurement system. Alternatively, one or more of the steps described in FIG. 2 may be executed periodically, e.g., as the methods described in FIGS. 3 and 4 are executed.

Turning to FIG. 2, in Step 200, the thermal imaging camera(s) is/are calibrated. The calibration is performed by measuring a blackbody (e.g., a blackbody cavity) at a known temperature point or at multiple known temperature points. The gain(s) of the thermal imaging camera(s) may then be adjusted such that the radiance temperature(s) indicated by the camera(s) match(es) the blackbody temperature(s). The calibration of Step 200 may be performed inside the furnace after the cameras have been installed, for example, if a reference body is installed in the furnace, or outside the furnace, prior to installation of the cameras.

In Step 202, potential atmospheric absorption and/or emission effects in the furnace are determined. Atmospheric absorption may occur if the atmosphere between the region of interest (ROI) being measured and the camera, at the wavelength used for performing the measurements, is absorbent. The degree of absorption may depend on the concentration of the gases that cause the absorption and on the distance between the ROI and the camera. The absorption may be determined based on measurements or based on known characteristics of the furnace atmosphere. A measurement-based determination of the absorption may be performed, for example, by measuring the radiance of an ROI in the furnace from different distances. The difference in the obtained radiance temperatures (lower radiance temperature for longer distance; higher radiance temperature for shorter distance) may be used to determine the atmospheric attenuation, assuming a particular relationship between distance and atmospheric absorption. This relationship may be assumed to be linear. Alternatively, the attenuation may be modeled, if the furnace atmosphere is understood. For example, it may be known that the furnace atmosphere contains a certain level of water vapor which, at the wavelength used for the measurements, causes a certain attenuation of the radiation over a certain distance. An absorption coefficient may be used to quantify the attenuation effect, determined in Step 202.

Similarly, atmospheric emissions may affect the accuracy of the measurement. Emission effects may occur, for example, if the atmosphere between the ROI being measured and the camera includes a flame. A flame may have a characteristic spectral emission spectrum. If this spectrum reaches overlaps with the wavelength used for performing the measurements, the measurement of the ROI's temperature may be exaggerated due to the radiation emitted by the flames. Accordingly, measurements performed through flames may require compensation for the atmospheric emissions caused by the flames. The flame enhancement effect may be measured or modeled, based on known characteristics of the furnace atmosphere. A measurement-based determination of the enhancement may be performed, for example, by measuring the same ROI in the furnace from different distances. The difference in the obtained radiance temperatures (higher measured radiance temperature for longer distance; lower measured radiance temperature for shorter distance) may be used to determine the atmospheric emissions, assuming a particular relationship between distance and atmospheric emission. This relationship may, for example, be assumed to be linear. Alternatively, the atmospheric emissions may be modeled based on known absorption characteristics, for example, of the fuel being burned. The model-based determination may be performed in real-time, as the methods described in FIGS. 3 and 4 are performed. In one embodiment of the invention, if a flame front is between a camera and a region of interest (ROI) being measured by the camera, the width of the traversed flame front may be considered, and the fuel flow to the burners associated with the flame front may be metered, such that, based on fuel flow and the type of fuel, the atmospheric conditions in the flame area and the corresponding atmospheric emissions can be modeled, thus enabling a dynamically correctable compensation for the atmospheric emissions. An emission coefficient may be used to quantify the emission effect, determined in Step 202.

In Step 204, the emissivity, e, of the surface in the ROI(s) is determined. Various methods may be used to assess the emissivity of an ROI being measured. The emissivity may, for example, be obtained from the literature, based on the material and surface characteristics in the ROI. Alternatively, the emissivity may be measured. Emissivity measurements may be performed once, e.g., when the temperature measurement system is installed, or periodically during the operation of the temperature measurement system. In one embodiment of the invention, the emissivity is determined based on a thermal radiance measurement obtained from the ROI and a thermal radiance measurement obtained from a reference body with a known emissivity, e.g., a blackbody that is known to have the same temperature as the target surface, in the ROI. Based on the discrepancy between the measured thermal radiance of the blackbody and the measured thermal radiance of the ROI, a gain factor, correcting for the difference in radiances received from the blackbody and the target surface, in the ROI, is determined. The inverse of the gain factor may be used as the emissivity of the target body in the ROI. Alternatively or in addition, a temperature sensor, e.g., a thermocouple, installed in the vicinity of the ROI may serve as a temperature reference for the purpose of determining an emissivity in the ROI. If the emissivity is determined periodically, Step 204 may be performed as part of the method described in FIG. 4.

FIG. 3 shows a method for measuring a temperature using thermal radiance measurements obtained from one or more thermal imaging cameras, in accordance with an embodiment of the invention. The method of FIG. 3 may be executed once to obtain one or more temperature measurements. Alternatively, the method may be executed repeatedly to obtain repeatedly updated temperature measurements. In one embodiment of the invention, the method may be used to continuously obtain temperature measurements in real-time or near-real-time, i.e., immediately after the radiance measurements were performed.

In Step 300, thermal radiance measurements are obtained from regions of interest (ROIs) inside the furnace. One thermal radiance value may be provided per pixel. Accordingly multiple thermal radiance measurements may be simultaneously received for a single ROI. Further, repeated measurements may be performed over a time interval. In one embodiment of the invention, the measurements are averaged to obtain a single thermal radiance measurement per ROI. Averaging may be performed over multiple pixels of the ROI and/or over time. The spatial averaging may consider the measurements obtained from all pixels of the ROI, or it may only consider measurements from a subset of the pixels. If measurements are performed in order to identify hotspots, no spatial averaging may be performed. Temporal averaging may be performed over a time interval that may include multiple measurements. For example, thermal radiance values from multiple consecutively recorded camera frames may be averaged, e.g., over one second or multiple seconds, to reduce the effect of short-term temperature fluctuations.

The spatial and/or temporal averaging may be performed for thermal radiance measurements. If the measurements, provided by the thermal imaging camera(s) are radiance temperatures, the radiance temperatures may be converted to thermal radiance values using Equation (2), prior to performing the averaging. Subsequently, Equation (1) may be used to convert the thermal radiance value to a radiance temperature, if desired. Step 300 may be performed for multiple or all ROIs in the furnace, resulting in a set of radiance temperature measurements and/or thermal radiance measurements.

In Step 302, measurements for the surface temperatures in the regions of interest (ROIs) are obtained from the thermal radiance measurements, in accordance with one or more embodiments of the invention. The thermal radiance measurements, obtained in Step 300, are corrected for environment-specific effects, and temperature measurements for the ROIs are derived from the corrected thermal radiance measurements. The corrections performed in Step 302 may include, but are not limited to, corrections for the emissivities of the surfaces in the ROIs, corrections for atmospheric absorption and/or emission effects in the furnace, and corrections reducing the effect of background radiation originating from other regions in the furnace, that is reflected by the ROIs. The details of Step 302 are described in FIG. 4.

In Step 304, the temperature measurements, obtained for the ROIs, are returned. These temperature measurements, after the corrections performed in Step 302, are assumed to accurately represent surface temperatures in the ROIs. The temperature measurements may be reported to a user and may, for example, be displayed in a spreadsheet and/or in a graphical visualization, e.g., in a heat map. Further, the temperature measurements may be archived, for example on a hard disk drive. The temperature measurements may further be used to control the operation of the furnace. In regions where excessive heat is detected, adjustments may be made to reduce the fuel flow to the burner(s), and in regions where temperatures are determined to be too low, the fuel flow to the burner(s) may be increased.

FIG. 4 shows a method for measuring surface temperatures in the regions of interest (ROIs), from the thermal radiance measurements obtained from these ROIs. The measurement, in accordance with one or more embodiments of the invention, corrects for environment-specific effects that may otherwise cause uncorrected radiance temperatures to deviate from the actual surface temperatures in the ROIs. In order to perform a correction of a single thermal radiance measurement obtained from a particular ROI, measurements from other ROIs within the furnace may be relied upon, as subsequently described.

In Step 400, an ROI, for which a surface temperature is to be measured, is selected. Many ROIs may be monitored in a furnace, in accordance with an embodiment of the invention. For example, the reformer furnace operator may want to know the surface temperatures of all reformer tubes. Accordingly, at least one ROI may be located on each of the reformer tubes, and in addition on walls, the floor, the ceiling, flame fronts, etc. A selected ROI may thus be one of the ROIs located on one of the reformer tubes.

In Step 402, the surrounding surfaces to be considered in the subsequently performed measurement of the surface temperature are identified. A surrounding surface may be a surface of another object in the reformer furnace. In one embodiment of the invention, the radiance of surrounding surfaces affects the radiance temperature measurement obtained from the ROI. In general, only surfaces in a hemisphere in front of the ROI may need to be considered in Step 402, as previously discussed with reference to FIG. 1C. Accordingly, the surrounding surfaces, identified in Step 402, may be specific to the ROI selected in Step 400. For example, in a scenario in which an ROI, located on a reformer tube, only faces a wall, a floor and a ceiling, only the wall, the floor and the ceiling may be considered surrounding surfaces. All other surfaces in the furnace, whether ROIs are placed on them or not, may be ignored. In contrast, in another scenario in which an ROI, located on a reformer tube, in addition faces a segment of a second wall, an adjacent reformer tube and a dirty flame (e.g., a flame that produces a considerable amount of soot), all of these surfaces may be considered surrounding surfaces.

In Step 404, a mean radiance is determined for each of the surrounding surfaces to be considered. The mean radiance of a surrounding surface may be determined based on a radiance measurement obtained from an ROI located on the surrounding surface. If multiple ROIs are placed on a single surface, a mean radiance may be obtained by calculating the mean of the radiances, obtained from the ROIs. Different ROIs may be weighted differently and/or one or more of the ROIs may be entirely ignored when obtaining the mean radiance.

In Step 406, a geometric view factor is determined for each of the surrounding surfaces to be considered. Generally, a geometric view factor for a particular surrounding surface may be understood as a weight to be applied to the corresponding mean radiance obtained in Step 404. Using the geometric view factors obtained in Step 406 and the mean radiances obtained in Step 404, a weighted radiance average may be calculated, as described in Step 408. A geometric view factor may be determined using the following surface integral over the ith surrounding surface, $A_i$:

$$g_i = \frac{1}{\pi} \int\int_{A_i} \cos\Theta_{in} d\omega_{in}, \tag{3}$$

where $g_i$ is the geometric view factor of the ith surrounding surface. A small element of an area, dA, on the surface, $A_i$, is located at the angle $\Theta_{in}$. $\Theta_{in}$, as previously described with reference to FIG. 1C, is the angle between the considered surface element and the normal to the target surface at the measurement location. dA subtends the small angle $d\omega_{in}$, at the measurement location. The geometric view factors of all considered surrounding surfaces sum to 1.

Equation (3) assumes an isotropically diffuse surface, in the ROI, i.e., a surface that equally reflects radiation in all directions. If this assumption is not justifiable, angular dependencies may be considered. These angular dependencies may be described using a bi-directional reflectance distribution function (BRDF), where the reflectance is a function of the polar and azimuthal angle describing the incident radiation and a polar and azimuthal angle specifying the direction of the reflected radiation. For surfaces that are not completely isotropically diffuse, the BDRF may thus be included in the equation for the geometric view factor.

In Step 408, the effective background radiance is determined. The effective background radiance, in accordance with an embodiment of the invention, is a weighted sum of the mean radiances of the surrounding surfaces to be considered, determined in Step 404. The weighting is performed using the geometric view factors obtained in Step 406. Accordingly:

$$S_b = \Sigma_{i=1}^{N} g_i Ss_i \quad (4),$$

where $S_b$ is the effective background radiance signal, N is the number of considered surrounding surfaces, and $Ss_i$ is the mean radiance signal of the ith surrounding surface.

In Step 410, the effective background radiance signal is removed from the radiance measured in the ROI, using $$S_s = \frac{S_m - (1-\varepsilon)S_b}{\varepsilon}, \quad (5)$$

where $S_s$ is the radiance signal received from the ROI on the surface of the selected reformer tube, after subtraction of the reflected background radiance, and where e is the emissivity of the surface in the ROI. Accordingly, $S_s$ is the radiance emitted by the reformer tube due to the reformer tube's temperature, in the ROI, in accordance with one or more embodiments of the invention.

In Step 412, a correction for atmospheric absorption and/or emission effects is performed. The correction may be performed by dividing the compensated radiance signal by the absorption and/or emission coefficient, obtained in Step 202. Step 412 may be performed to address atmospheric effects that would otherwise result in erroneous temperature measurements. More specifically, the correction for atmospheric absorption addresses effects that would result in depressed temperature measurements, whereas the correction for atmospheric enhancement addresses effects that would result in inflated temperature measurements. As previously described in Step 202, the correction may consider the composition of the atmosphere, the distance between the ROI and the camera, and may dynamically update based on predicted atmospheric changes, e.g., based on the type of burner fuel, the length of the flame front traversed in a measurement, the fuel flow to the burner, etc.

In Step 414, the compensated radiance signal is converted to a surface temperature. Equation (1) may be used for the conversion. Steps 410-414 may be performed on the averaged radiance signal obtained from the entire selected ROI. Alternatively or additionally, Steps 410-414 may be performed on a radiance signal obtained from a single pixel or separately from multiple pixels within the selected ROI. Performing these steps on single pixel measurements may allow the determination of a surface temperature with a high spatial resolution, for example, in order to detect local hotspots on the surface of the reformer tubes.

In Step 416, a determination is made about whether additional ROIs are remaining for which a surface temperature measurement is to be obtained. Such ROIs may be located, for example, on other reformer tubes. If a determination is made that additional ROIs are remaining the method may return to Step 400. If no more ROIs are remaining, the method may terminate.

While the various steps in the flowchart are presented and described sequentially, one of ordinary skill will appreciate that some or all of these steps may be executed in different orders, may be combined or omitted, and some or all of the steps may be executed in parallel. In one embodiment of the invention, the steps shown in FIG. 2 may be performed in parallel with any other steps shown in FIG. 2 without departing from the invention.

Embodiments of the invention may enable accurate measurement of temperatures. Methods and systems, in accordance with one or more embodiments of the invention, are particularly suitable for hostile environments such as the interior of furnaces, e.g., reforming, annealing, metal or glass-making furnaces, etc., where measuring the temperature of an object may be complicated by factors including the object's emissivity, flame effects, reflection contributions, atmospheric effects and the geometry of the furnace, among others. The temperature measurements may be obtained for a single or many regions of interest, at any time and instantaneously.

A temperature measurement system, in accordance with one or more embodiments of the invention, may be used for real-time monitoring and real-time control of temperatures in industrial applications including reformers, boilers, etc. In a reforming furnace the furnace temperature may be regulated based on the obtained temperature measurements to optimize processes within the reformer furnace. In particular, the temperature measurements may be used to minimize variations in reformer tube wall temperatures, thereby avoiding potentially detrimental hotspots, and to operate the reformer at a higher reformer temperature without violating the maximum allowable reformer tube wall temperature. As a result, lifetime of the reformer tubes may increase, while the operating point of the reformer may simultaneously improve, thus resulting, for example, in increased reformer output, reduced preheating times, etc.

The system, in accordance with one or more embodiments of the invention, relies on one or more thermal imaging cameras that simultaneously capture data from all regions of interest (ROIs) in the furnace. Measurement accuracy may increase because the method does not require manually targeting a region of interest with a hand-held pyrometer. Because radiance measurements are instantaneously and simultaneously available from all ROIs, reliable temperature measurements may be obtained even in environments where dynamically changing temperatures in the furnace do not allow a temperature measurement based on sequentially taken radiance measurements. Further, because the system does not require the opening of furnace doors in order to perform a radiance measurement, perturbations of the furnace atmosphere, associated with opening furnace doors, are avoided.

Temperature sensing solutions, in accordance with one or more embodiments of the invention, in comparison to manually performed conventional temperature measurements, may be more cost effective, more accurate, may provide coverage of more regions of interest and may be performed more frequently (e.g., rapidly and continuously) in an automated manner, while reducing the risk for personnel.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for measuring furnace temperatures, comprising:
    obtaining radiance measurements from a plurality of regions of interest (ROIs) in a furnace, employing a plurality of thermal imaging cameras;
    measuring a surface temperature of the furnace using a radiance measurement obtained from a ROI selected from the plurality of ROIs, including:
        determining an effective background radiance affecting the selected ROI, using a weighted average of radiance measurements obtained from ROIs that are different from the selected ROI and that are in a hemisphere in front of the selected ROI;
        obtaining a compensated radiance by removing the effective background radiance from the radiance measurement obtained from the selected ROI; and
        converting the compensated radiance to the measured surface temperature of the furnace, wherein the radiance measurement obtained from the selected ROI is obtained from a plurality of pixels in the ROI, averaged over at least one selected from the group consisting of space and time.

2. The method of claim 1, wherein the furnace is a steam reformer furnace and each of the plurality of ROIs is a surface region on one selected from a group consisting of a reformer tube, a wall, a floor, a ceiling and a flame front.

3. The method of claim 1, wherein the radiance measurements are concurrently obtained; and wherein the surface temperature is measured in real-time.

4. The method of claim 1, wherein the radiance measurements are obtained at a wavelength of incident radiation of about 850 nm or about 3.9 µm using the thermal imaging cameras.

5. The method of claim 1, wherein the effective background radiance affecting the selected ROI is calculated from a geometric view factor-based weighted average of radiance measurement of the surfaces within a hemisphere in front of the selected ROI.

6. The method of claim 1, wherein the selected ROI is obtained from a first camera of the plurality of cameras and the ROIs used for determining the effective background radiance for the selected ROI are obtained from one or more cameras other than the first camera.

7. The method of claim 1, further comprising: correcting the radiance measurement obtained from the selected ROI for an emissivity of the selected ROI.

8. The method of claim 7, wherein the emissivity is determined through comparison of the radiance measurement obtained from the selected ROI with a radiance measurement obtained from a reference body with a known emissivity and a known temperature.

9. The method of claim 7, wherein the emissivity is determined using a reference temperature measured in the vicinity of the selected ROI utilizing a temperature sensor.

10. A method of monitoring and controlling a furnace, comprising:
    obtaining radiance measurements from a plurality of region of interest (ROIs) in a furnace utilizing a plurality of thermal imaging cameras;
    measuring a surface temperature of the furnace using a radiance measurement obtained from an ROI selected from the plurality of ROIs, including:
        determining an effective background radiance affecting the selected ROI utilizing radiance measurements obtained from ROIs different from the selected ROI;

obtaining a compensated radiance by removing the effective background radiance from the radiance measurement obtained from the selected ROI;

converting the compensated radiance to the measured surface temperature of the furnace, wherein the radiance measurement obtained from the selected ROI is obtained from a plurality of pixels in the ROI, averaged over at least one selected from the group consisting of space and time; and making local adjustments to a fuel flow to burners to control the surface temperatures of the furnace.

11. The method of claim 10, wherein the effective background radiance affecting the selected ROI is calculated from a geometric view factor-based weighted average of radiance measurements of the surfaces within a hemisphere in front of the selected ROI.

12. The method of claim 10, wherein the radiance measurements are concurrently obtained; and wherein the surface temperature is measured in real time.

13. The method of claim 10, wherein the furnace is a steam reformer furnace and each of the plurality of ROIs is a surface region on one selected from a group consisting of at least a reformer tube, a wall, a floor, a ceiling and a flame front.

14. The method of claim 13, wherein the local adjustments to the fuel flow to the burners are performed to ensure that all reformer tubes operate below a maximum allowable reformer tube wall temperature.

15. The method of claim 14, wherein the local adjustments to the fuel flow to the burners are performed to mitigate hotspots on the reformer tubes.

16. The method of claim 14, wherein the local adjustments to the fuel flow to the burners is performed to minimize variation in reformer tube wall temperatures.

17. The method of claim 14, wherein the local adjustments to the fuel flow to the burners are performed to operate the reformer at a higher reformer temperature without violating the maximum allowable reformer tube wall temperature.

18. A system for measuring furnace temperatures, comprising:

a plurality of thermal imaging cameras and a processing unit configured to obtain radiance measurements from a plurality of regions of interest (ROI) of a furnace using the plurality of thermal imaging cameras, wherein the thermal imaging cameras are utilized to measure a surface temperature of the furnace using a radiance measurement obtained from an ROI selected from the plurality of ROIs, including:

determining an effective background radiance affecting the selected ROI using a weighted average of radiance measurements obtained from the ROIs that are different from the selected ROI and are within a hemisphere in front of the selected ROI;

the processing unit is employed to obtain a compensated radiance by removing the effective background radiance from the radiance measurement obtained from the selected ROI; and converting the compensated radiance to the measured surface temperature of the furnace, wherein the radiance measurement obtained from the selected ROI is obtained from a plurality of pixels in the ROI, averaged over at least one selected from the group consisting of space and time.

19. The system of claim 18, wherein the thermal imaging cameras are automatically retracted upon loss of cooling.

20. The system of claim 18, wherein the thermal imaging cameras are located outside the furnace to obtain the inside view of the furnace through ports disposed in the furnace walls.

21. The system of claim 18, wherein the thermal imaging cameras operate at incident radiation wavelength of about 850 nm or about 3.9 μm.

22. The system of claim 18, wherein a reference body is disposed inside or outside the furnace to calibrate the thermal imaging cameras.

* * * * *